March 26, 1963 K. E. BELKNAP 3,082,475
TURKEY LEG FLEXOR
Filed Feb. 11, 1960
Fig. 1.
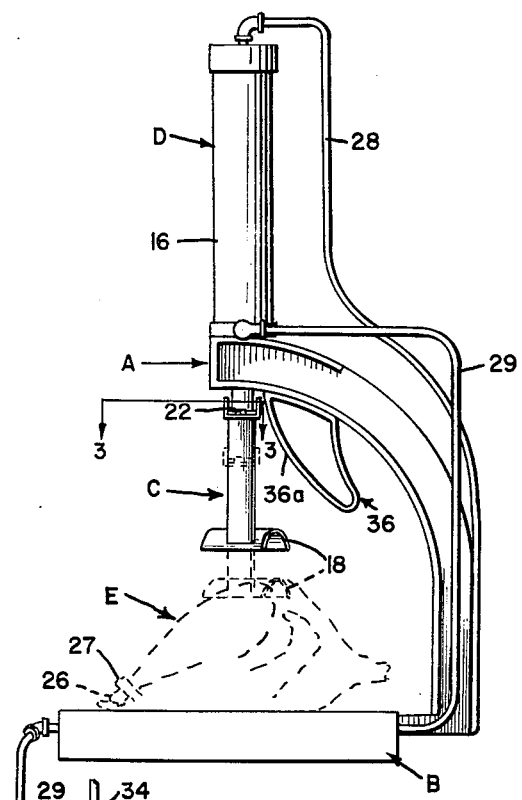
Fig. 2.
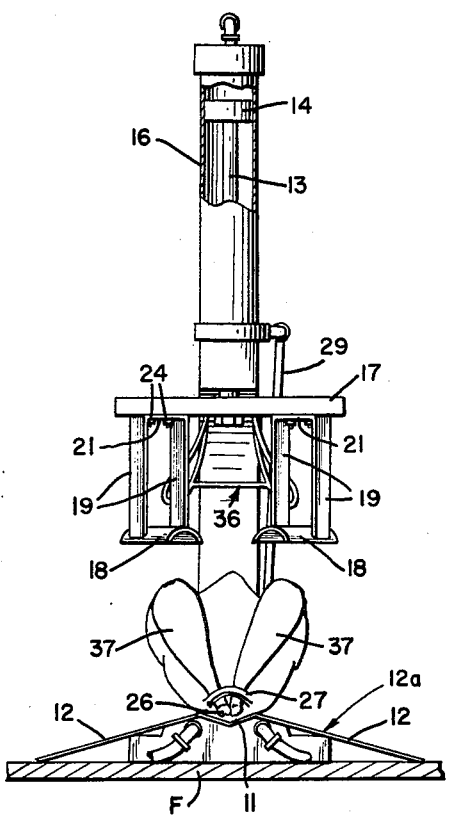
Fig. 3.
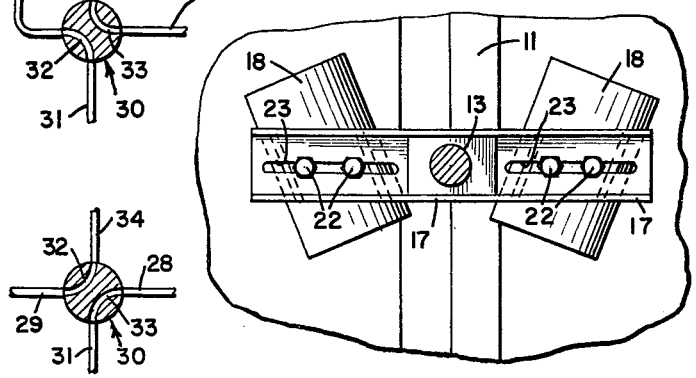
Fig. 1a.
INVENTOR.
Kenneth E. Belknap
BY
Townsend and Townsend
attorneys United States Patent Office 3,082,475
Patented Mar. 26, 1963

3,082,475
TURKEY LEG FLEXOR
Kenneth E. Belknap, Dinuba, Calif., assignor to Hydrahone Equipment Company, Milwaukee, Wis.
Filed Feb. 11, 1960, Ser. No. 8,186
4 Claims. (Cl. 17—11)

This invention relates to a device for flexing the legs of a turkey or similar fowl to overcome the stiffness incurred by rigor mortis and for the purpose of repositioning the legs in the proper haunched position against the breast of the bird with the hock joints tucked under the bar strap of the bird.

In eviscerating turkeys, it is common practice in the art to make two cuts in the abdomen to effect removal of the viscera. Normally, a circular cut is made around the vent opening to release the latter from the skin and body tissues of the bird. A second cut, which is an elongate transverse cut, is made across the abdomen space perhaps an inch above the vent opening. Through this latter cut the viscera is removed from the body cavity. The band or section of skin between the vent opening cut and the transverse cut is referred to by the trade, and is designated herein, as the "bar strap."

During the normal course of evisceration, it is customary to flex the legs of the turkey, chicken or other such fowl to a folded and haunched position against the breast of the bird and with the hock joints tucked under the bar strap. This is usually done before the first pre-chill. After the first pre-chill, in some plants the legs are flexed again and repositioned relative to the bar strap before they are put into the chill tanks and covered with ice. After the birds are in the chill tanks for a period of eight hours or more and rigor mortis has set in, it is necessary to again flex the legs, as the large percentage of hocks have slipped through and beyond the bar strap out of the proper position for packaging.

In conventional practice, in order to flex a bird's legs after rigor mortis has set in, eviscerating plants have employed men to perform the task manually by grasping the bird's thighs and, as the bird is lying on its back, forcing the thighs down as far as possible in order to flex the stifle and thigh joints and bring the thighs back so that the hock ends are tucked under and covered by the bar strap. This is very hard manual labor since, during the process of taking the body heat out of the bird and chilling them to a temperature of about 38° to 40° F., the bird's leg joints become rigid due to rigor mortis and tend to straighten out and push the legs forward, whereby the hock joints project through and beyond the bar strap. Because of the rigidity and the temperature of the bird, the flexing of the legs requires a considerable expenditure of physical strength. As a consequence, the operation is slow and tedious and results in substantial labor costs.

Prior art practices have utilized devices for initially folding the legs of an eviscerated bird. Primarily, such devices have been used in plants where birds are eviscerated and processed for packing prior to refrigeration and following the stage of operations where birds are suspended by their legs from overhead trackways or endless belts to transfer them from one point of the plant to the other. As a result of such a practice, the legs of the birds stiffen at the joints while the legs are in a rearwardly extending position. It then becomes necessary to bend the outstretched legs of the birds so that they may be further processed, since it would not be possible to do so if the legs of the birds were to remain in an outstretched position. Many plants, therefore, utilize a device that will bend back the outstretched legs of the birds to a folded or haunched position such as the kind of unit shown in U.S. Patent Serial No. 2,560,067, issued to Leland J. Bell, January 10, 1951.

Prior art devices of the type above mentioned cannot be made to operate so as to perform the task capable of being fulfilled by the herein-disclosed invention. More specifically, force that is necessary to accomplish the initial bending back to a folded position of the outstretched legs of a bird according to the prior art is a force exerted in a substantially axial alignment relative to the longitudinal axis of the bird. But, in order to accomplish the leg flexing and hock tucking that is contemplated by the device of my invention, the force must be applied in substantially a perpendicular direction (i.e., downward pressure) relative to the longtudinal axis of the bird's body.

The object of the present invention is to provide a device of the character herein described that will flex the haunched legs of a chilled turkey so that the jagged edged hock joints of the legs may be easily placed or repositioned in tucked relationship under the bar strap of the bird, thereby protecting any packaging material that may otherwise be torn or damaged by such jagged hock joints.

Other objects of the present invention will become apparent upon reading the following specification and referring to the accompanying drawings in which similar characters of reference represent corresponding parts in each of the several views.

In the drawings:

FIG. 1 is a view in side elevation of the present invention showing the piston shaft in its retracted position and its downward position in broken lines and also showing a schematic view of the valve arrangement for operating the device.

FIG. 1a is a schematic view of the valve shown in FIG. 1 in its reversed position.

FIG. 2 is a front elevational view of the invention in operation with certain parts broken away and with the shaft in position for flexing a bird's legs.

FIG. 3 is a sectional view in enlarged scale taken on lines 3—3 of FIG. 1.

Referring more specifically to the drawings, the device is shown as comprising generally a primary substantially C-shaped frame A, on the lower leg of which is carried a stationary horizontal bird supporting tray or platen B and the upper leg extremity of which is mounted the reciprocable leg engaging and flexing mechanism indicated generally at C operated by an air motor D. A bird, such as a turkey, indicated generally at E is shown supported on tray B in its normal position during machine operation.

The bird supporting tray or platen heretofore indicated generally at B may comprise a section of sheet material 12a, preferably stainless steel, formed with a wide and relatively shallow V-shaped recess 11 which is shaped and configured to receive in nested supporting position the back portion of a turkey or other bird to be processed. The opposite sides 12 of the platen B extend laterally outwardly and downwardly to provide broad surfaces for manipulating the bird into and out of centered position of the platen during machine loading and unloading operations.

The leg engaging and flexing mechanism heretofore designated at C comprises a shaft 13 connected to a piston 14 reciprocably mounted within air cylinder 16. The lower end of the shaft 13 carries a cross-bar or channel beam 17 from opposite ends of which depend identically constructed leg-engaging cups 18. More specifically, each cup 18 is vertically suspended and supported from an associated end of channel beam 17 by a pair of depending legs 19 attached to a supporting plate 21. Plate 21 is apertured to receive securing bolts 22, the upper ends of which project slidably through slots 23 formed in the horizontal webs of the channel beam 17. Conventional tightening nuts 24 are employed to secure the plates 21 to the underside of the channel beam 17 in a longitudinally adjustable position in reference to said channel beam 17. More specifically by loosening the nuts 24, the plates 21 carrying the cup members 18 can be slidably adjustably moved closer together or further apart from one another to accommodate different size fowl being processed.

The cups 18 as shown in the drawings are formed of curvatured bands of sheet metal and define inverted troughs, the longitudinal axes of which are slightly angularly displaced from one another in order to engage the legs of a bird which, as shown in the drawings, converge at their hock joints 26 where they are tucked under the bar strap 27 of the bird.

Air motor D consisting of the aforementioned shaft 13, piston 14, and cylinder 16 is operable to reciprocably raise and lower the leg engaging and flexing mechanism C relative to a bird E positioned on the supporting platen or tray B. In the usual installation, a foot pedal (not shown) actuated air valve of suitable and conventional design is provided to actuate the air motor and to move the piston 14 upwardly or downwardly within the cylinder 16 as desired. In the drawings, the air supply and valving system is shown partially schematically. More specifically, the drawings disclose two air hoses 28 and 29 connected respectively to the upper and lower ends of cylinder 16. A reversing valve, indicated schematically generally at 30 is operable to supply air under pressure from a compressor's source 31 to either the upper or lower half of cylinder 16 while simultaneously venting the other half of the cylinder to atmosphere. More specifically, valve 30 is schematically shown as comprising a circular valve body formed with 2 valve ports 32 and 33. When the valve body is rotated to its position shown in FIG. 1, port 32 establishes air pressure communication from source 31 to conduit 29 communicating to the bottom half of cylinder 16. Simultaneously, communication to atmosphere vent 34 is established between the upper half of cylinder 16 via hose 28 and valve port 33. In this instance the compressed air supplied to the lower half of cylinder 16 will force the piston 14 upwardly therein and similarly cause the leg engaging and flexing mechanism C to move upwardly to its raised position as shown in full lines in the drawings. FIG. 1a discloses the valve element rotated 90°, whereby port 33 establishes air compressed communication via hose 28 to the upper half of cylinder 16 while venting to atmosphere the lower half of the cylinder via hose 29 and port 32. In this position of operation, it is apparent that the mechanism C will be forcefully lowered.

A guide unit indicated at 36, and comprising a pair of wire members shaped generally in the nature of butterfly wings and depending from the upper portion of frame A defines a pair of elongate cam surfaces 36a which are positioned to engage the cross-beam 17 at opposite sides of its point of attachment to shaft 13 when the mechanism is in its raised position. More specifically, it will be appreciated that the leg engaging mechanism C, because it is supported by the piston shaft 13 is rotatable under influence of external torsional force about the axis of shaft 13. It is desirable to permit the mechanism C to freely rotate because it permits the leg engaging cups 18 to more or less self-align themselves when they are lowered into engagement with the legs 37 of the bird to be processed. In this regard it is appreciated that in processing birds in volume on a production line, it is to be expected that the birds will not always be positioned in the same precise position on the platen B and that variations in the position of the birds' legs will occur due to variations in size of the birds and in their individual shapes and in the manner in which they are individually positioned on the tray. It is for this reason, as above noted that it is desirable to permit the cups 18 to rotatably shift about the axis of the piston shaft to adjust themselves to the legs of the particular bird being processed. Conversely, it is equally desirable that each time the mechanism C is raised to its upper position, and before the next cycle of operation is commenced, that the mechanism C be rotated to a precisely aligned position relative to the stacking tray. Because the cam surfaces 36a engage the cross-beam 17 as the latter reaches the upper end of its stroke, it is seen that the cross-beam will be rotatably moved to the same starting position or alignment relative to the bird supporting tray or platen B.

In operation and recapitulating in part, a bird to be processed is positioned on the tray B whereby the V-shaped trough 11 supports the back portion of the bird and in such a manner that the breast and legs of the bird face upwardly. The bird is placed on the tray B so that the thighs and stifle joints of the bird are approximately vertically aligned beneath the leg engaging cups 18 of mechanism C. It is appreciated that at the stage of process in which the present machine is normally used, the birds have been chilled or refrigerated for a considerable period of time and normally with the hock joints 26 of the legs tucked beneath the bar strap 27. However, as earlier noted, the effect of rigor mortis is often such as to cause the legs to partially return to their rearwardly outstretched position resulting in the projection of the hock joints under the bar strap. It is desirable in the packaging of the birds in plastic bags to secure the hock joints in tucked and protected relationship directly under the bar strap of skin to avoid the possibility of the relatively jagged hock joints from coming in direct contact with and possibly rupturing the plastic bag. Accordingly, the principal purpose of the present machine is to reflex the legs of the bird to tightly haunched position against the breast of the bird and to make certain that the hock joints are retracted to a point directly beneath, and covered by, the bar strap of skin. Thus, when air is introduced into the top half of the cylinder 16 and the cups 18 are lowered forcefully into engagement with the legs 37 of the bird, it is seen that this downward pressure against the legs will accomplish the desired results of pressing the legs against the breast of the bird which causes retraction of the hock joints beneath the bar strap if, in fact, the latter has in the refrigerating or handling process slipped beyond the bar strap as above noted.

Obviously, when it is desired to raise the mechanism C and to disengage cups 18 from the legs, the valve 31 is reversed to cause air to raise piston 14 and the entire assembly C carried thereby.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. An apparatus for flexing an eviscerated bird's haunched legs downwardly and rearwardly against the breast of the bird comprising: a C-shaped frame member having a platen mounted on the lower leg of said frame member, said platen defining an axial trough to receive in partially nested position and to support the eviscerated bird on its back, leg flexing means slidably mounted on the opposite leg of said frame member movable toward and away from said support means in a direction normal to the longitudinal axis of said trough, motor means mounted on said frame member and connected to said leg flexing means to move said leg flexing means downwardly and rearwardly against the haunched legs of said bird, said motor means comprising a pneumatically actuated cylinder and piston shaft connected to said leg flexing means, leg engaging cups mounted on the lower end of said leg flexing means to engage the legs of the bird thereby compressing and retracting the legs against the breast of the bird as leg flexing means is lowered, and aligning means mounted on said frame operable to align said cups with said platen and the legs of a bird supported thereon.

2. The combination of claim 1 and wherein said leg flexing means and cups carried thereby are freely rotatable about the axis of said piston shaft under influence of torsional forces exerted through contact of the cups with the legs of a bird being treated, and wherein said aligning means comprising fixed cam means are mounted on said frame and engageable with said leg flexing means when the latter is in raised position, said cam means cooperable with said leg flexing means to rotate the latter to the same vertically aligned position in reference to said platen each time said leg flexing means is moved to its raised position.

3. An apparatus for flexing an eviscerated bird's haunched legs downwardly and rearwardly against the breast of the bird comprising: a C-shaped frame member having a platen mounted on the lower leg of said frame member adapted to support the eviscerated bird on its back in alignment with the longitudinal axis of said platen, leg flexing means slidably mounted on the opposite leg of said frame member movable toward and away from said support means in a direction normal to the longitudinal axis of said support means, motor means mounted on said frame member and connected to said leg flexing means to move said leg flexing means downwardly and rearwardly against the breast of the bird, and a pair of horizontally spaced apart engaging cups formed from curved bands mounted on the lower end of said leg flexing means to engage the legs of the bird thereby compressing and retracting the legs against the breast of the bird as the leg flexing means is lowered, alignment means mounted on said frame member thereby permitting said leg flexing means to come in proper contact with said bird's legs each time the latter is lowered, said alignment means comprising fixed cam means on said frame operable so that when said leg flexing means is in the upward position said cam means engage said bands causing said leg flexing means to be cammed into a vertically aligned position relative to said platen whereby downward movement of said leg flexing means and bands will directly and properly engage the legs of the bird positioned on said platen with said bands.

4. The combination of claim 3 and wherein said cups are mounted on the lower end of said flexing means for adjustably spaced positioning relatively nearer or further apart from one another to accommodate different size birds being treated.

References Cited in the file of this patent
UNITED STATES PATENTS

| | | |
|---|---|---|
| 376,383 | Higginson | Jan. 10, 1888 |
| 481,174 | Horton | Aug. 23, 1892 |
| 2,560,067 | Bell | July 10, 1951 |